US008256690B2

(12) United States Patent
Newberry

(10) Patent No.: US 8,256,690 B2
(45) Date of Patent: Sep. 4, 2012

(54) RADIANT HEATING AND COOLING PANEL

(75) Inventor: Dean Talbott Newberry, Davis, CA (US)

(73) Assignee: Talbott Solar and Radiant Homes, Inc., Davis, CA (US)

( * ) Notice: Subject to any disclaimer, the term of this patent is extended or adjusted under 35 U.S.C. 154(b) by 1078 days.

(21) Appl. No.: 12/150,053

(22) Filed: Apr. 23, 2008

(65) Prior Publication Data

US 2008/0264602 A1     Oct. 30, 2008

Related U.S. Application Data

(60) Provisional application No. 60/926,457, filed on Apr. 27, 2007.

(51) Int. Cl.
*F24D 3/12* (2006.01)
*F24D 3/14* (2006.01)
*F24D 3/16* (2006.01)

(52) U.S. Cl. ............... 237/71; 237/56; 237/69; 165/49; 165/48.1; 165/53; 432/31; 432/225

(58) Field of Classification Search ............ 237/69, 237/56, 63, 65, 67, 70, 71; 165/49, 48.1, 165/50, 53; 432/31, 225, 232; *F24D 3/02, F24D 3/12, 3/14, 3/16*
See application file for complete search history.

(56) References Cited

U.S. PATENT DOCUMENTS

| | | | | |
|---|---|---|---|---|
| 1,800,150 A * | 4/1931 | Musgrave et al. | ............... | 165/56 |
| 2,548,036 A * | 4/1951 | Milborn | ........................... | 165/56 |
| 2,681,796 A * | 6/1954 | Rapp | ............................. | 165/56 |
| 3,108,454 A * | 10/1963 | Raskin | ............................. | 62/235 |
| 3,384,158 A * | 5/1968 | Rothenbach | .................... | 165/49 |
| 4,186,795 A * | 2/1980 | Platell | ............................ | 165/53 |
| 4,205,719 A * | 6/1980 | Norell et al. | .................... | 165/76 |
| 4,336,793 A * | 6/1982 | Ahearn et al. | ................. | 126/621 |
| 4,338,995 A * | 7/1982 | Shelley | .......................... | 165/49 |
| 4,369,836 A * | 1/1983 | Bleckmann | ................... | 165/171 |
| 4,646,814 A * | 3/1987 | Fennesz | .......................... | 165/56 |
| 4,791,773 A * | 12/1988 | Taylor | ........................ | 52/786.13 |
| 5,131,458 A * | 7/1992 | Bourne et al. | .................. | 165/56 |
| 5,579,996 A * | 12/1996 | Fiedrich | .......................... | 237/69 |
| 5,597,033 A * | 1/1997 | Cali | .............................. | 165/55 |
| 5,799,723 A * | 9/1998 | Sokolean | ........................ | 165/49 |
| 5,862,854 A * | 1/1999 | Gary | ............................... | 165/55 |
| 6,082,353 A * | 7/2000 | van Doorn | .................... | 126/659 |
| 6,283,382 B1 * | 9/2001 | Fitzemeyer | .................... | 237/69 |

(Continued)

FOREIGN PATENT DOCUMENTS

CH         610093 A5 *  3/1979
(Continued)

*Primary Examiner* — Steven B McAllister
*Assistant Examiner* — Daniel E Namay
(74) *Attorney, Agent, or Firm* — Temmerman Law Office; Matthew J. Temmerman

(57) ABSTRACT

A radiant panel for use in radiant heating and cooling systems that provides numerous benefits over conventional panels currently in use. The radiant panel comprises an offset hydronic radiant tube channel in which is nested a hydronic radiant tube that obviates the need to thread the hydronic tubes through the joists in a ceiling installation or the studs in a wall installation. In an alternative embodiment, specific emissivity coatings on each side of the radiant panel further promote the efficient transfer of heat. The system provides increased sound isolation and is robust enough to withstand the crushing forces associated with a floor installation.

17 Claims, 6 Drawing Sheets

U.S. PATENT DOCUMENTS

| | | | |
|---|---|---|---|
| 6,330,980 B1 * | 12/2001 | Fiedrich | 237/69 |
| 6,533,185 B1 * | 3/2003 | Muir | 237/69 |
| 7,992,623 B2 * | 8/2011 | Keller | 165/53 |
| 8,025,240 B2 * | 9/2011 | Keller | 237/69 |
| 8,028,742 B2 * | 10/2011 | Fiedrich | 165/56 |
| 2004/0174504 A1 * | 9/2004 | Hara et al. | 355/30 |
| 2007/0277811 A1 * | 12/2007 | Hollick | 126/621 |
| 2009/0314848 A1 * | 12/2009 | Andersson | 237/71 |

FOREIGN PATENT DOCUMENTS

| | | | |
|---|---|---|---|
| DE | 3113504 A1 * | 12/1982 | |
| DE | 3941618 A1 * | 6/1991 | |
| EP | 23043 A2 * | 1/1981 | |
| EP | 364809 A1 * | 4/1990 | |
| JP | 55131696 A * | 10/1980 | |
| JP | 56030589 A * | 3/1981 | |
| JP | 56030590 A * | 3/1981 | |
| JP | 63054527 A * | 3/1988 | |
| JP | 01314832 A * | 12/1989 | |
| JP | 02178536 A * | 7/1990 | |
| JP | 06281172 A * | 10/1994 | |
| JP | 07019533 A * | 1/1995 | |
| JP | 2003307321 A * | 10/2003 | |
| WO | WO 8807158 A1 * | 9/1988 | |
| WO | WO 9624009 A1 * | 8/1996 | |

* cited by examiner

RADIANT HEATING AND COOLING PANEL

RELATED APPLICATION

This application is based on provisional application 60/926,457, filed Apr. 27, 2007.

FIELD OF THE INVENTION

The present invention relates to radiant heating and cooling systems, specifically the structure of radiant heating and cooling system panels.

GENERAL BACKGROUND OF THE INVENTION

Hydronic radiant heating is one of the oldest known forms of floor heating in the world, having its origins in ancient Rome. Radiant heating came into widespread use in the U.S. during the post-World War II building boom. Modern radiant systems include underfloor heating systems, wall-heating systems, and radiant ceiling systems.

Conventional household heating and cooling systems are based on forced convection heating, wherein system-generated air convection currents circulate through the home and regulate air temperature. Radiant heating and cooling systems utilize the principle of radiant heat transfer a more efficient form of transferring heat.

The earth is warmed by heat radiation through radiant heat transfer. All non-reflective bodies in the path of this radiation exchange thermal radiation continuously, and have their temperature elevated by absorption of the radiation. This fact is appreciated when one feels the thermal comfort of the sun on an otherwise lower ambient temperature day. Likewise, greenhouses capture radiant energy from the sun, withholding more energy than escapes.

In a radiant heating system, a heat transfer plate on the radiant panel acts as the sun heating the Earth in the above example. Thus, radiant systems heat people and objects directly, as opposed to merely the air space around the people and objects as in conventional household heating systems. Indirectly, the air temperature in a radiant heating or cooling system is changed as well. To effectuate this transfer of heat, the radiant system has radiant panels which in turn have embedded within them hydronic tubing or electric conduits that alter the temperature of a heat transfer plate. In a warming system, resistance within the electric circuit, or warm water flowing through the hydronic tubing warms the heat transfer plate (generally a large flat panel) through conduction, which in turn radiates heat energy to a living space. In systems where the heat transfer plates are concealed behind an object such as drywall, the heat transfer plate passes heat to the object through conduction that in turn radiates heat to the living space. In some installations, the heat transfer plate is omitted and the electric circuit or hydronic tubing is simply placed behind the walls, warming the walls directly.

The Applicant's invention relates specifically to the hydronic tube type radiant heating and cooling systems. In hydronic radiant systems, tubes in direct mechanical contact with the panels carry heated water. The choice of liquid used is dependent on factors such as corrosiveness of the liquid, resistance to contamination, filtration, freezing temperature, and evaporation.

In hydronic radiant cooling systems chilled water is circulated through the hydronic tubes. The cooling occurs in water chillers, heat pumps, condensing units with heat exchangers, evaporative cooling towers, evaporative "night sky" cooling, or in some cases even naturally cool ground water can be used. The cool water chills the radiant panels that absorb heat from the living space.

Heat transfer plates may be integrated into ceiling units, may be recessed, embedded in the floor or ceiling, or may be surface-mounted. The plates may be either concealed or visible. The plates are often concealed behind drywall or under floorboards to give the appearance of a normal floor, wall or ceiling. The type of application generally determines the type of plate to be used. For instance, discrete-metal or framed-fiberglass modules are commonly used in T-bar grid ceiling heating installations.

In concealed overhead ceiling installations, heat is ideally efficiently transferred to the ceiling itself, which in turn acts as the radiant energy delivery surface. Similarly, in a wall concealed installation the wall itself acts as the radiant energy delivery surface and in a floor installation the floor acts as the energy delivery surface. Visible designs are generally steel or aluminum linear plates that are mounted directly on the ceiling surface. Visible designs installed in T-bar grid ceiling systems are generally modular panels having flat, grooved, or channeled surfaces.

The benefits of radiant heating and cooling systems over conventional systems are that the radiant systems heat and cool with fewer areas of unevenness, heat and cool with increased efficiency, and do so without human-detectable noise. Uneven heating/cooling and noise have traditionally been problems in a traditional air convection heating and cooling system. Further, because there is no significant air movement in a radiant heating or cooling system, the movement of dust, dirt, pollen, bacteria and other germs is dramatically reduced. Because radiant heating systems warm the objects in a room directly (as opposed to merely warming the air that flows over them), heat loss from openings in the room to be heated is less of an issue than in systems that merely heat or cool the air. Perhaps the most important benefit lies in the energy saving through the use of these systems. In contrast to air handling systems, radiant heating and cooling systems typically utilize 30% less energy (based on title 24 analysis of three identical houses using each method) to produce the same or better level of comfort for the house's inhabitants.

Despite the many benefits of radiant heating and cooling systems, there are still problems hindering their widespread adoption by consumers. One drawback involves the placement of the hydronic tubes used to deliver heat energy to and pull heat energy from the room being temperature regulated. These tubes are generally concealed behind the walls or ceiling of the room being regulated. Hence, there must be a space to accommodate them. In many installations, such as standard T-bar ceiling installations, space is not tight and thus is not an issue. In still many other installations, some offset must be provided to the wall or ceiling to leave space for the placement of the hydronic tubing.

Problems in the past faced by installers of hydronic radiant heating and cooling systems, and homeowners using such systems are related to the shape of the heat transfer plates typically nailed or screwed to ceiling joists, or to studs in a wall. By affixing flat heat transfer plates directly to the joists or studs, there is no space behind the plate (opposite the living space side) for the hydronic tubing, which is typically much thicker than the plate itself. Thus, to place the hydronic tubing on the side of the heat transfer plates facing away from the living space, holes must be drilled in the joists or studs through which the tubing may pass. This occurs numerous times in each room in which the system is installed, increasing labor and costs. Additionally, this installation often requires the hydronic tubes to be bent away from the heat transfer plate and around the joists or studs, or away from the heat transfer plate and through the holes drilled in the joists or studs. This can put tension on the radiant panels and can cause the edges to warp up and away from contact with the drywall. This warping decreases the size of the contact patch between the heat transfer plate and the ceiling or drywall to which the heat is transferred through conduction, thus degrading the overall efficiency of the system.

A problem related to heating and cooling systems in general relates to energy use. Due to rising oil and electricity costs, many of the most recent innovations in air conditioning technology have placed an emphasis on energy efficiency. While radiant heating and cooling systems utilize 30% less energy than conventional heating and cooling systems (see above), there remains room for improvement. For instance; in a radiant heating system, much of the heat not transferred to the living space simply remains as energy in the heated liquid in the hydronic tubing. In a cooling system, cool water is returned. Energy losses occur in the system through less than perfect conduction transfer between the hydronic tube and the radiant panel, through mechanical losses by the pumping process, and through radiant and conductive losses through the supply and return piping itself.

In a ceiling installation, relatively large amounts of energy are lost as a result of intermittent contact between the heat transfer plate and the drywall. A common current approach to radiant floor systems is generally known as the stapleup method. Here, the hydronic tubing is suspended on plastic stand-off clips about half an inch from the joist. No emitter plates are used. In a heating system, the water is circulated at a very high temperature, and warms the air in the floor cavity, which in turn warms the floor. This inefficient heat transfer process works well when there is very good insulation under the entire assembly, as the heat generated migrates into the floor and warms the house, instead of out to the subfloor space. Transfer of heat in these floor systems and in general for any installation is increased through good mechanical contact between the radiant panel and the floor or drywall that is exposed to the living space.

A second main source of inefficiency relates to the emissivity and conductance on each side of the heat transfer plate. Ideally a radiant panel assembly will efficiently transfer energy from the heat transfer fluid to the hydronic tube thence to the heat transfer plate and to the drywall while not losing any heat to the backside of the radiant panel. Heat transferred to the backside of the panel (away from the living space) is generally an inefficient use of energy.

An additional problem occurs in floor installations. In these installations, the heat transfer plates and associated hydronic tubes are subjected to far more stress than they are subjected to in a ceiling installation. For instance, furniture may be placed on top of the panel after installation, and it is very likely foot traffic will occur over the installation. These crushing forces can damage the panels, the tubes or both.

To offset expected heat loss in a radiant panel heating system, the temperature of the circulating liquid is increased. However, a similar solution (lowering the temperature of the circulating fluid to offset the expected heat loss) is not feasible in radiant cooling systems, because once the temperature of the liquid is decreased by too much, condensation can occur, damaging the building or home in which the system is installed. Efficient pumps and well insulating piping can mitigate some of these losses, but larger efficiency results are generally obtained through measures taken near the radiant panel itself.

There is thus a need to further improve the efficiency of radiant heating and cooling systems, and a need to ease the installation of such systems by avoiding the need to drill holes through joists or studs.

It is thus a first objective of the present invention to provide a heat transfer plate that obviates the need to thread the radiant panel system hydronic tubes through the joists in a ceiling or studs in a wall.

It is a second objective of the present invention to provide a heat transfer plate for floor, ceiling, or wall installations that provides efficient transfer from heat from the panel to the floor or ceiling, both through a large contact point between materials through which heat is conducted and through a radiant panel having a low emissivity coating on the side facing away from the living space and a high emissivity coating on the side facing towards the living space.

It is a third objective of the present invention to provide a sturdy floor installation solution for radiant panel installation that will allow the radiant panels and associated hydronic tubes to withstand the crushing forces associated with this type of installation.

BRIEF DESCRIPTION OF THE FIGURES

The foregoing aspects and many of the attendant advantages of the invention will become more readily appreciated as the same becomes better understood by reference to the following detailed description, when taken in conjunction with the accompanying drawings, wherein.

SUMMARY OF THE INVENTION

Applicant thus discloses a novel heat transfer plate that provides numerous benefits over conventional heat transfer plates. The heat transfer plate comprises a groove providing an offset channel for a hydronic radiant tube within the panel that obviates the need to thread the hydronic tubes through the joists in a ceiling installation or the studs in a wall installation. In an alternative embodiment, specific emissivity coatings on each side of the radiant panel further promote the efficient transfer of heat. The Applicant's system provides increased sound isolation and is robust enough to withstand the crushing forces associated with a floor installation. In a concealed installation, applicant's disclosed plates are in better mechanical contact with the drywall than conventional concealed installations.

DETAILED DESCRIPTION OF THE INVENTION

For the following detailed description and claims, the term "living space" shall refer to the area in a home or building in which the occupants are commonly found.

The applicant discloses a radiant plate comprising a portion offset from the joists or studs to which it is attached. A channel is disclosed within the offset space through which the hydronic tube is positioned.

Figure 1:
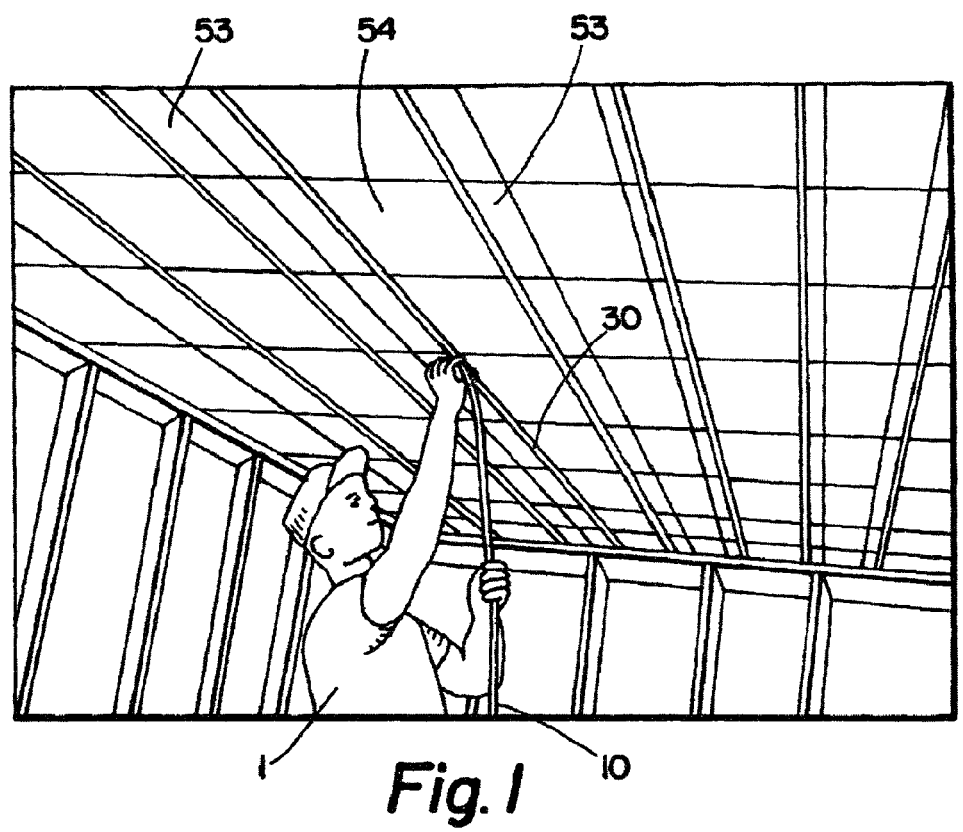
FIG. 1 depicts a perspective view of a hydronic tube installer in a living space.

Referring now to FIG. 1, an installer 1 is depicted in a living space easily threading a hydronic tube 10 into a channel 30. In this case the hydronic tube in use is Hydronic Alternatives ½" PEOC-PLUS PE-RT 5-layered heating pipe with oxygen barrier, but any type of hydronic tubing could be installed just as easily and without departing from the spirit of the invention.

Figure 2:
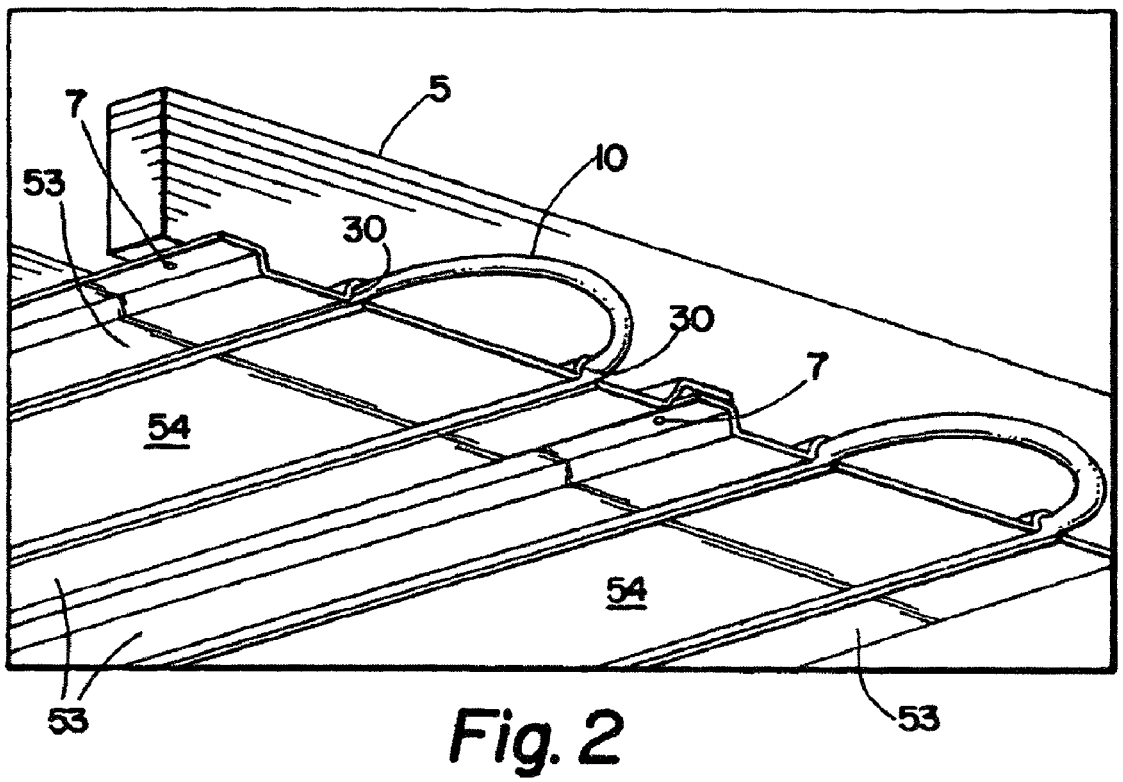
FIG. 2 depicts a perspective view of a preferred embodiment of the invention.

Referring now to both FIG. 1 and FIG. 2 for purposes of clarity, a series of parallel radiant plates (not numbered) is depicted, each comprising a flat center 54 and two flat edges 53. The radiant plates are better depicted in FIG. 2 wherein each radiant plate depicted comprises flat center 54 and two flat edges 53. Still referring to FIG. 2, a screw 7 secures the radiant plate to a joist 5. In an alternative embodiment this screw may be replaced with a nail (not shown) and in a wall installation joist 5 may be replaced with a stud or any other beam. In a conventional installation, joist 5 would need to be drilled with holes large enough to allow the hydronic tube to pass through, and hydronic tube 10 would be on the side of the radiant plate facing away from the living space. Here, an offset allows the hydronic tube 10 to pass between the joist 5 and the surfaces 53 and 54 of the radiant plate.

Figure 3:
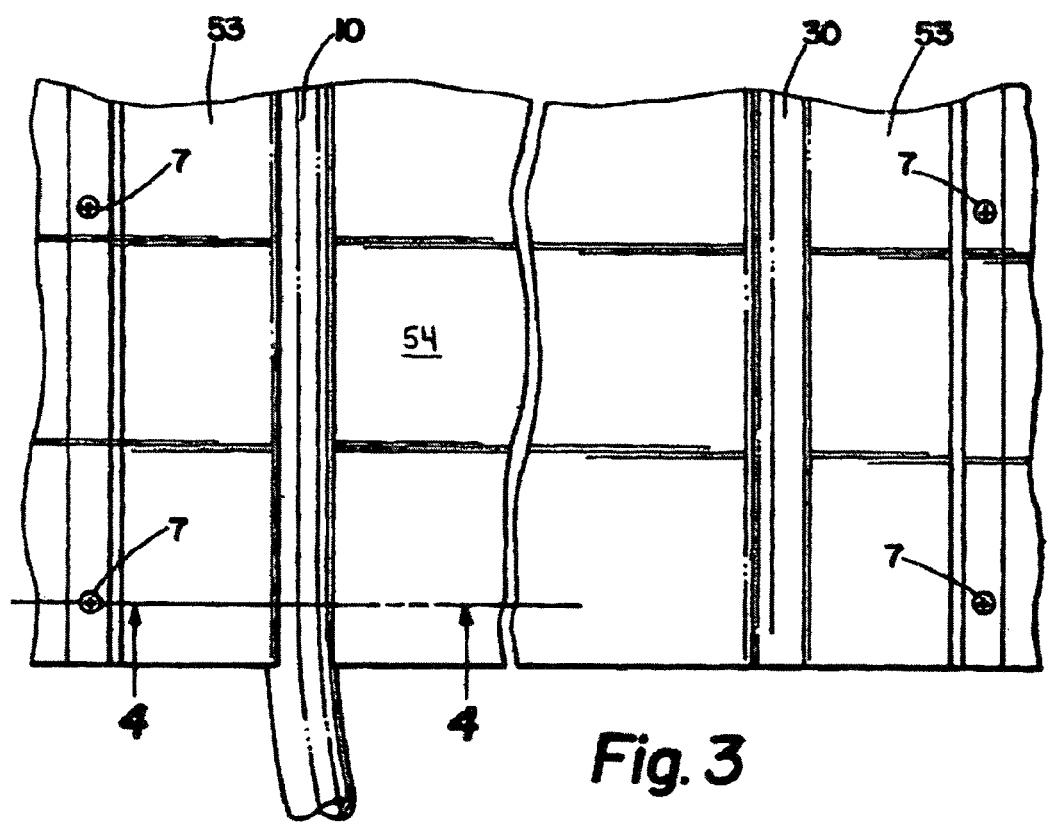
FIG. 3 depicts a planer view of the invention showing a side that faces the living space, with a hydronic tube installed in one channel.
Figure 4:
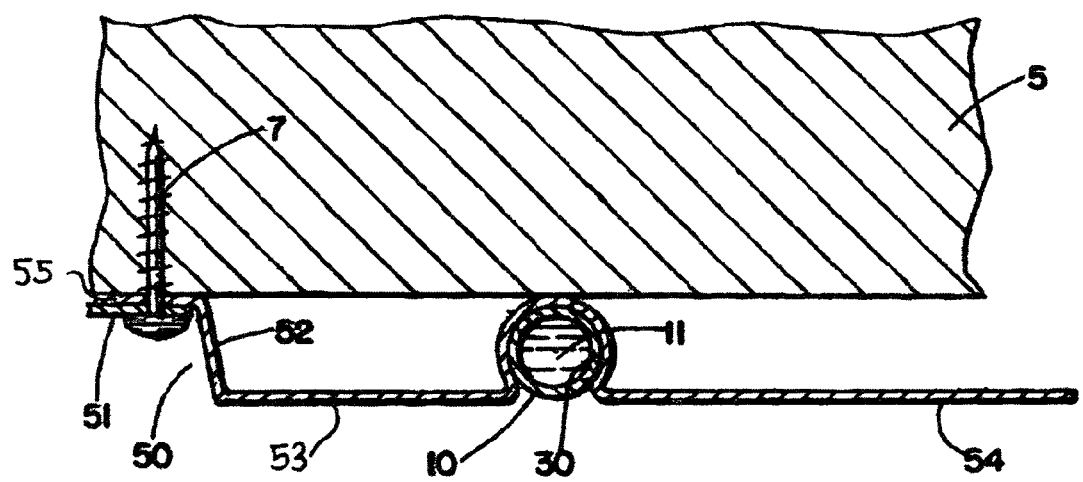
FIG. 4 is a cross sectional view taken along line 4-4 from FIG. 3.

FIG. 3 shows one radiant plate with a portion of its flat center 54 cut away for diagrammatic simplicity. Ideally, this large flat center 54 is in complete or substantial mechanical contact with a drywall surface 61 (not shown in FIG. 3 but shown in FIGS. 5 and 6) of a piece of drywall 60 (also shown in FIGS. 5 and 6). FIG. 3 depicts channel 30, which is also depicted in FIG. 4. As shown in FIG. 4, into this channel is nested the hydronic tube 10, and inside which is a liquid 11. Hydronic tubing is typically flexible enough to be easily forced through the opening to channel 30 for a snug fit. Referring back to FIG. 3, the nested hydronic tube 10 can be seen in its installed configuration. Screws 7 are depicted that after installation secure the radiant panel to the joist 5 as better observed in FIG. 4.

Figure 5:
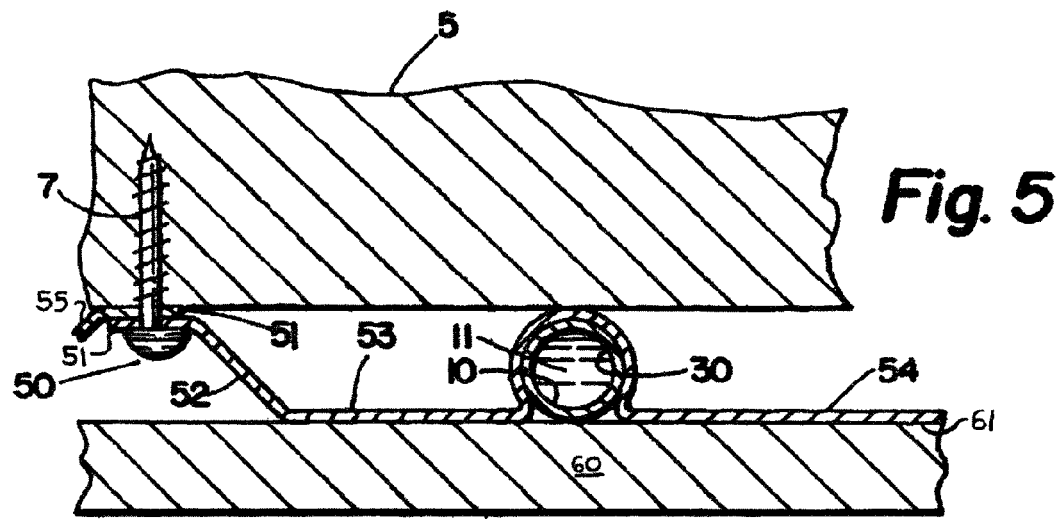
FIG. 5 is a cross sectional view of a first alternative embodiment of the invention.
Figure 6:
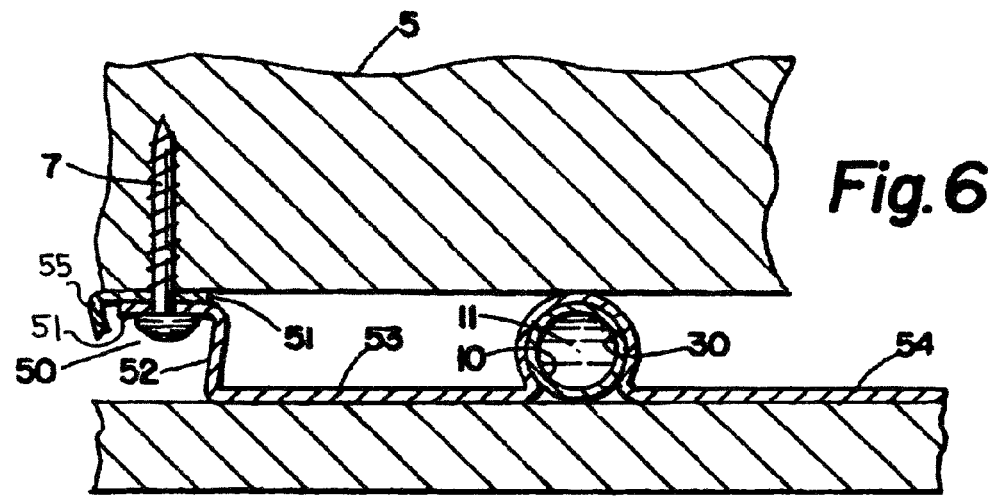
FIG. 6 is a cross sectional view of a second alternative embodiment of the invention.

Referring now to FIGS. 4, 5, and 6, a screw recess 50 is shown. Screw 7 passes through an aperture (not shown) in a first flap 51 and a second flap 55. Each radiant panel has two flaps (first flap 51 and second flap 55) which overlap after installation as shown. Flaps 51 and 55 are in a plane generally parallel with the plane shared by flat edge 53 and flat center 54, although offset from the plane of both. See FIGS. 4-6. Connecting flat edge 53 and first flap 51 is a bridge 52. A similar bridge connects second flap 55 on the other side of the panel. Bridge 52 connects flat edge 53 with the flap through an angle that in a preferred embodiment of the invention is approximately 135-degree with respect to flat portion 53 and flat center 54. See FIG. 5. The effective range of angles spans from approximately 150 degrees (FIG. 5) to 80 degrees (FIG. 6). In FIG. 4, the angle between bridge 52 and flat edge 53 is approximately 100 degrees. Importantly, the angle between the bridge 52 and the pieces to which it connects allows the bridge to impart a degree of flexibility to the radiant panel.

Figure 7:
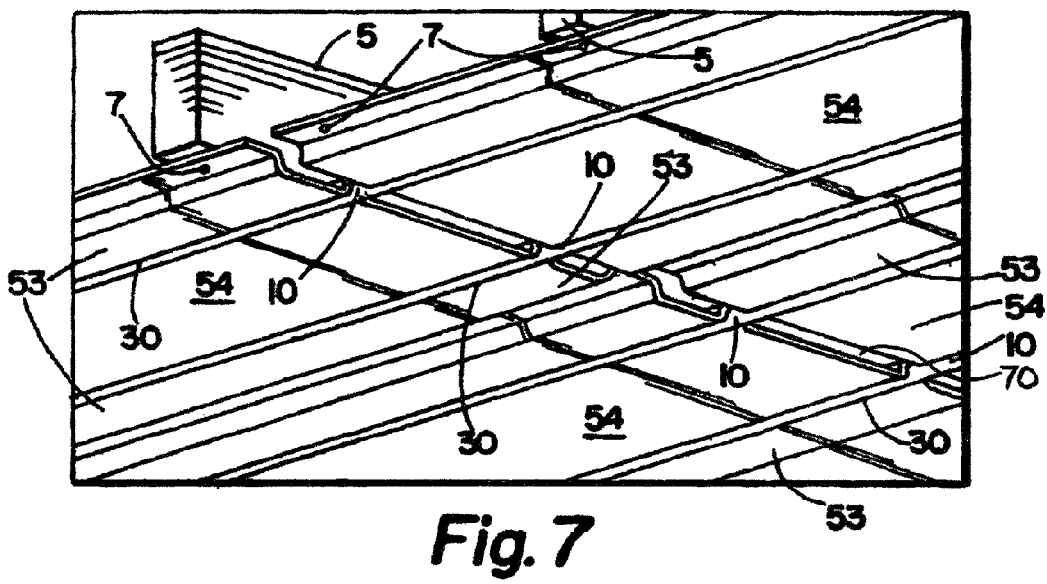
FIG. 7 depicts a second perspective view of a preferred embodiment of the invention.

FIG. 7 duplicates many of the various reference numbers for clarity. FIG. 7 also shows in detail the end point between one radiant plate and the next radiant plate is shown by a gap 70. In practice, gap 70 may be much smaller than as depicted. The image shows that there is generally no overlap in plates end to end like there is between plates side to side (see overlapping flaps 51 and 55, FIGS. 4-6).

On each of the installed radiant plates, a first side (comprising flat center 54 and flat edges 53) faces toward the living space, as shown in FIG. 1. A second side of the radiant plate (still comprising flat center 54 and flat edges 53) faces away from the living space. In a ceiling installation this second side faces toward the joists, in a wall installation it faces toward the studs and in a floor installation it faces downwards toward the foundation of the house.

To further decrease heat loss in the system, the radiant plate second side (facing away from the living space) may be coated with a low emissivity coating, and the radiant plate first side (facing towards the drywall and living space) may be coated with a high emissivity coating. In practice, the applicant accomplishes this by painting the second side of the plate with a highly reflective, low emissivity coating such brilliant aluminum paint (emissivity of 0.31), Finch aluminum paint 643-1-1 emissivity of 0.23), chromeric silver paint 586 (emissivity of 0.30) and the first side facing the living space (and the hydronic tubes) with a highly emissive coating such as Martin Black Paint N-150-1 (emissivity of 0.94), GSFC White Paint NS44-B (emissivity of 0.92), P764-1A White Paint (emissivity of 0.92). In one embodiment, the first side has an emissivity of no less than 0.8 and the second side has an emissivity of no greater than 0.2. In another embodiment the first side has an emissivity of no less than 0.85 while the second side has an emissivity of no greater than 0.15. The emissivity of the aluminum is already quite low and may be used as the low emissivity side (without paint) in some instances, however, if galvanized steel panels are used, oxidation will occur over time and emissivity will be increased unless the steel is coated in a low emissivity paint. The benefit on the radiant plate first side is that there will always be imperfect contact with the drywall, and improving the emissivity increases heat transfer. By adjusting the emissivity of each of the two sides in this way, heat escaping from the radiant plate second side can be minimized, while heat escaping through the radiant plate first side is maximized.

Since for an object in thermal equilibrium emissivity equals absorptivity, the Applicant's solution is also applicable to radiant panels used for cooling purposes.

In the past, a similar practice has been used on solar flat plate collectors, wherein on the absorptive side only, emissivity has been increased to facilitate absorbed radiation. Solar collectors, however, do not couple this emissivity coating with a low emissivity backing.

It is noted that the emissivity (e) of a material indicates how well the material radiates and absorbs energy as compared to an ideal black body, and is measured on a scale from 0 to 1, where 0 is a perfectly reflective material which does not absorb or radiate any energy, and 1 is a perfect black body, which absorbs and radiates all energy contacting it. Real objects cannot behave as perfect black bodies, and thus all real objects have emissivity of less than 1. Although factors such as temperature, emission angle and wavelength preclude the emissivity of a material from being constant, engineers commonly assume for practical purposes that emissivity is in fact a constant. This assumption is known as the grey body assumption, and unless otherwise indicated, this patent will make the grey body assumption.

Figure 8:
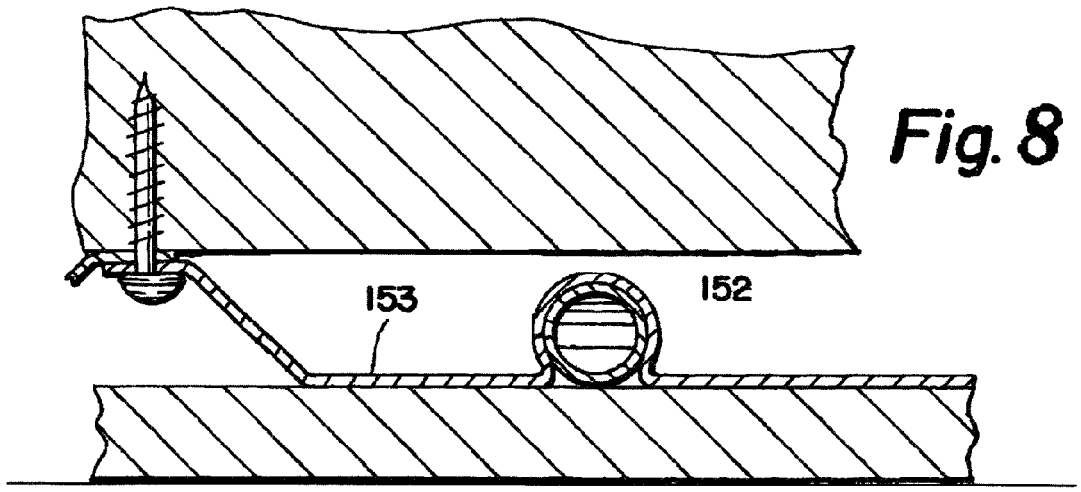
FIG. 8 is a cross sectional view of a third alternative embodiment of the invention.

In an alternative embodiment of the invention, the disclosed heat transfer plate is made from resilient channel (hereinafter "RC Channel") or from aluminum sheets fabricated into RC Channel. A common means of reducing the transmission of airborne sound through partition ceiling assemblies in multistory multifamily buildings is RC Channel, and hence in this embodiment, the invention provides the dual benefits of sound attenuation and radiant heating. In this alternative embodiment as shown in FIG. 8, the structures are generally the same except the bridge (labeled "53" in FIGS. 4-6) is referred to here as an RC bridge 153 and is lengthened to allow a clearance space 152 between the hydronic tube and the joist. The clearance allows flexing in the bridge to prevent vibration in the joist being transmitted through that potential contact point to the drywall suspended underneath. The angle of RC Bridge 153 is significant in damping vibration between the panel attachment to the joist and the drywall attachment to the suspended panel.

In use, the flat center 54 and two flat edges 53 provide a large contact area to the drywall surface 61 in a ceiling installation. See FIG. 5. As shown in FIG. 5, the drywall surface 61 is almost completely in direct mechanical contact with the radiant plate 2. This configuration provides for superb conductivity, and much of the heat exchanged by the hydronic tube is transferred to the drywall.

Referring again to FIG. 1, it is observed that over 80% of the drywall surface 61 (not shown), when placed over the radiant plates depicted, will be in direct mechanical contact with said radiant plates. Additionally, the hydronic tube 10 may be in direct contact with said drywall surface 61 (not shown).

Referring now to FIGS. 4, 5, and 6, the importance of bridge 52 is discussed. In the preferred embodiment shown in FIG. 5 wherein the angle between the flat edge 53 and the bridge 52 is approximately 135 degrees, an optimum combination of both strength and sound deadening is exhibited. The angle between bridge 52 and the flat edge 53 may range, in various embodiments, from between 40 degrees and 110 degrees, from between 80 degrees and 150 degrees, and from between 90 degrees and 135 degrees.

With respect to the above description then, it is to be realized that the disclosed equations, figures and charts may be modified in certain ways while still producing the same result claimed by the Applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:

1. A radiant heating and cooling system, the system comprising:
   a. a ceiling joist;
   b. a radiant panel affixed directly to said joist, said radiant panel comprising:
      i. a planar plate having a first side facing towards a living space and a second side facing away from said living space;
      ii. a flexible bridge;
      iii. a flap; and
      iv. a hydronic tube channel on said first side and having an open side facing toward said living space;
   c. a hydronic tube nested in said hydronic tube channel, the hydronic tube having a diameter;
   d. a section of drywall having a surface facing away from said living space and wherein said plate first side is substantially in direct mechanical contact with said surface; and
   e. wherein said plate, said hydronic tube channel, said flexible bridge , and said flap are contiguous and each have a thickness less than 25% of said hydronic tube diameter.

2. The radiant heating and cooling system of claim 1, wherein at least 80% of said surface is in contact with said first side.

3. The radiant heating and cooling system of claim 1 wherein said radiant panel further comprises a space between said radiant panel and said joist.

4. The radiant heating and cooling system of claim 3 wherein an angle between said flexible bridge and said radiant panel is between 40 degrees and 110 degrees.

5. The radiant heating and cooling system of claim 2 wherein said radiant panel further comprises a space between said radiant panel and said joist and wherein said flexible bridge provides flexibility in a direction not parallel with said plate.

6. The radiant heating and cooling system of claim 5 wherein an angle between said flexible bridge and said radiant panel is between 40 degrees and 110 degrees.

7. The radiant heating and cooling system of claim 6 wherein said first side has an emissivity of no less than 0.8 and said second side has an emissivity of no greater than 0.2.

8. The radiant heating and cooling system of claim 1, wherein said surface is in direct mechanical contact with said hydronic tube.

9. The radiant heating and cooling system of claim 8 wherein said radiant panel further comprises a space between said radiant panel and said joist and wherein said flexible bridge provides flexibility in a direction not parallel with said plate.

10. The radiant heating and cooling system of claim 9 wherein an angle between said flexible bridge and said radiant panel is between 40 degrees and 110 degrees.

11. The radiant heating and cooling system of claim 10 wherein said first side has an emissivity of no less than 0.8 and said second side has an emissivity of no greater than 0.2.

12. The radiant heating and cooling system of claim 11 wherein said first side has an emissivity of no less than 0.85 and said second side has an emissivity of no greater than 0.15.

13. A radiant heating and cooling system comprising:
   a. a plurality of radiant plates each further comprising at least one hydronic tube channel, a first side facing a living space, a second side facing away from said living space, and at least one flexible bridge contiguous with said at least one hydronic channel;
   b. a hydronic tube nested within said hydronic tube channel;
   c. a piece of drywall, said drywall having a surface in contact with said first side and said hydronic tube;
   d. a ceiling joist having a plane, wherein each of said radiant plates is affixed to said joist in said plane; and
   e. at least two planes in each of said radiant plates, neither plane overlapping the other, and connected by said bridge, wherein an angle between said bridge and one of said planes is between 90 degrees and 150 degrees.

14. The radiant heating and cooling system of claim 13, wherein said angle is between 110 degrees and 135 degrees.

15. The radiant heating and cooling system of claim 13 wherein said first side has an emissivity of no less than 0.8 and said second side has an emissivity of no greater than 0.2.

16. The radiant heating and cooling system of claim 15 wherein said first side has an emissivity of no less than 0.85 and said second side has an emissivity of no greater than 0.15.

17. The radiant heating and cooling system of claim 14 wherein said first side has an emissivity of no less than 0.85 and said second side has an emissivity of no greater than 0.15.

* * * * *